United States Patent
Chilan

(10) Patent No.: US 8,244,417 B2
(45) Date of Patent: Aug. 14, 2012

(54) METHOD FOR MAINTAINING POSE OF SPACECRAFT

(75) Inventor: Christian Chilan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/840,959

(22) Filed: Jul. 21, 2010

(65) Prior Publication Data

US 2012/0022726 A1  Jan. 26, 2012

(51) Int. Cl.
- B64G 1/36 (2006.01)
- G05D 1/00 (2006.01)
- G05D 3/00 (2006.01)
- G06F 7/00 (2006.01)
- G06F 17/00 (2006.01)

(52) U.S. Cl. ......................................................... 701/13

(58) Field of Classification Search .................. 701/3, 4, 701/13, 31, 116, 226; 244/158.1, 158.4, 244/158.8, 164, 169, 171.1, 171.2
See application file for complete search history.

(56) References Cited

U.S. PATENT DOCUMENTS 5,267,167 A * 11/1993 Glickman ...................... 701/531
6,205,378 B1 * 3/2001 Rodden et al. .................. 701/13

OTHER PUBLICATIONS

Conway, Bruce A., et al., "Evolutionary principles applied to mission planning problems," Dec. 8, 2006, Springer Science+Business Media B.V. 2006.*
Richards, Arthur, et al., "Plume Avoidance Maneuver Planning Using Mixed Integer Linear Programming," AIAA Guidance, Navigation, and Control Conference and Exhibit, Aug. 6, 2001.*

* cited by examiner

Primary Examiner — Mary Cheung
Assistant Examiner — Kyle K Tsui
(74) Attorney, Agent, or Firm — Dirk Brinkman; Gene Vinokur

(57) ABSTRACT

Embodiments of invention disclose a system and a method for formation-keeping of a spacecraft in response to a displacement of the spacecraft to a displaced pose with respect to at least one direction of the displacement, wherein the spacecraft is configured to issue a compensative force by generating a command to issue a compensative force. The compensative force is determined as a function of a sum of the base force configured for maintaining the spacecraft in the displaced pose with respect to the direction of the displacement and an excess force configured for optimizing the formation-keeping with respect to the direction of the displacement of the spacecraft at the displaced pose.

18 Claims, 4 Drawing Sheets

METHOD FOR MAINTAINING POSE OF SPACECRAFT

FIELD OF THE INVENTION

This invention relates generally to positioning a spacecraft, and more particularly to a system and method for maintaining a pose of a spacecraft within an error range from a base pose.

BACKGROUND OF THE INVENTION

Spacecrafts are frequently used to facilitate communication, gather scientific data, facilitate geopositioning and conduct extraterrestrial observations. For example, space-based observatories enable observations without being subject to weather constraints and atmospheric effects that affect a quality of the observations. For example, satellites are indispensable for observation systems that gather scientific data regarding climate and natural resources at a global scale.

In some applications the spacecraft has to be maintained at a base pose. For example, a number of applications use of a constellation of two or more cooperating spacecrafts. The use of the spacecraft for such applications requires that the distance between each spacecraft in the constellation is maintained with a fairly high accuracy. Accordingly, the spacecraft has to be positioned in a particular arrangement within prescribed error ranges.

Unfortunately, spacecrafts are subject to "perturbative" forces, such as those caused by the non-uniform gravity of the Earth, gravitational effects of other heavenly bodies, solar pressure, atmospheric drag, and propulsion systems. For spacecrafts in low altitude orbits, atmospheric drag is usually the predominant perturbative force. The perturbative forces vary due to a number of factors, including the oblateness ($J_2$) of the Earth, variations in atmospheric density and temperature, and the magnitude of solar activity.

Because the forces due to these factors can be non-uniform, and because the mass and profile of each spacecraft can vary over time and from one spacecraft to another, atmospheric drag and the other perturbations affect the inter-spacecraft spacing of constellations of spacecrafts. Thus, if no action is taken, the spacecraft is displaced from its predetermined positions and move beyond their prescribed error ranges. In order to maintain proper inter-spacecraft positioning, the spacecraft in the constellation compensates for the perturbative forces.

Recent applications based on a dual-spacecraft configuration require a "follower" spacecraft to be at a fixed relative position with respect to a "leader" spacecraft, within an error range, in an order of centimeters, for long periods of time while being subject to known disturbances such as differential drag, and $J_2$ effects. A state, i.e., position and velocity, of the spacecraft is $s=[x, v_x, y, v_y]^T$, controls available at the spacecraft are $c=[\Delta V_x, \Delta V_y]^T$, and T is a transpose operator. The dynamics of the spacecraft can be described according to a difference equation, $$s_{k+1}=As_k+Bc_k+d_k,$$

where matrices A and B represent physical characteristics of the spacecraft, and a vector $d_k$ represents the perturbative forces. The difference equation determines a next k+1 state of the spacecraft at a next time step based on a current state k of the spacecraft, the control, and the perturbative forces.

Linear Quadratic Regulator

One conventional formation-keeping method is based on a linear quadratic regulator (LQR), which is a type of a feedback controller. The LQR defines a desired state of the spacecraft as $s=[0, 0, 0, 0]^T$, which describes the spacecraft at a predetermined position. Then, any non-zero value for the position and the velocity of the spacecraft is considered a displacement that must be minimized.

A quadratic cost function J to minimize is $$J = \frac{1}{2}\sum_{k=1}^{\infty} [s_k^T Q s_k + c_k^T R c_k],$$

where Q and R are typically diagonal matrices whose elements correspond to weights on the state error and control cost. An optimal solution for systems with controls that are continuous in magnitude and are applied during the extent of every time step is a feedback law that relates the control directly to the current state, $$c_k=-Ks_k \qquad (1)$$

where $$K=B^TPB+R)^{-1}B^TPA,$$

and P is the solution of the algebraic Riccati equation, $$A^TPA-P-A^TPB(B^TPB+R)^{-1}B^TPA+Q=0.$$

Although LQR controllers are generally used in spacecraft systems, where the control is continuous in time and magnitude, an impulsive approximation is carried out by modulating either the magnitude or the time periods between the impulses.

Time-Modulated LQR Control

Time-modulated LQR control is based on setting a threshold value for the control input $\Delta V_{thresh}$. During the time interval between impulses, disturbances can cause the spacecraft to be displaced from the predetermined position, so the magnitude of the state variables $s_k$ increases, and the magnitude of the control variables $c_k$ also increases according to Equation (1). When the control reaches the threshold, an impulse of magnitude $\Delta V_{thresh}$ is applied to the spacecraft. The threshold value and the weight matrices Q and R can be obtained empirically. Thus, in the time-modulated LQR control method, the magnitude of the impulsive force is always fixed, and the method determines only the times when the impulses are issued.

Magnitude-Modulated LQR Control

Magnitude-modulated LQR control is based on fixing the times of the impulses at constant intervals, and applying the impulse magnitude that is provided by the feedback law in Equation (1). The impulse times are generally obtained by empirically adjusting the duration of the time step and the weight matrices Q and R. If the disturbances are known, then future disturbance can be integrated forward during the current time step to yield a feedforward term $\Delta V_f$ that can be added to the feedback $\Delta V$.

Limitations of LQR controllers include hard constraints, such as error thresholds, cannot be specified directly but only through the adjustment of parameters. Controllers can use the knowledge of disturbance during the time step, but no optimization is performed. LQR formation-keeping with error thresholds of less than a meter require time steps of a few seconds, which yield a large number of impulses. Furthermore, magnitude-modulated LQR control requires defining small time steps of the order of a few seconds, which further increases the number of impulses.

Linear Programming Control

Another formation-keeping method uses linear programming (LP) to generate control plans for a predetermined time in the future, to keep the spacecraft near the predetermined position, while minimizing propellant consumption. A length of the time is defined as the number of time steps in the future considered by the optimization.

A vector containing the states parameters s, control parameters c, and optimization parameters w for each future time step is $z=[s_0, c_0, w_0, s_1, c_1, w_1, \ldots, s_N]^T$, and $d=[d_0, d_1, \ldots, d_{N-1}]^T$ is a vector of known disturbances during the predetermined future time period. Vectors containing lower and upper bounds on the states, controls, and optimization parameters, are $b_L=[s_0, c_{min}, 0, s_{min}, c_{min}, 0, \ldots, s_{min}]^T$ and $b_U=[s_0, c_{max}, w_{max}, s_{max}, c_{max}, w_{max}, \ldots, s_{max}]^T$ respectively. For the generation of the plan, an initial state $s_0$ is constant and is determined by measurements. The corresponding LP problem is, $$\min f^T z$$

subject to $$b_L \leq z \leq b_U, Cz=d, Ez \leq 0,$$

where $$f = [0 \ 0 \ 1 \ 0 \ 0 \ 1 \ \ldots \ 0]^T$$

$$C = \begin{bmatrix} -A & -B & 0 & I & 0 & 0 & 0 & \ldots & 0 & 0 & 0 & 0 \\ 0 & 0 & 0 & -A & -B & 0 & I & \ldots & 0 & 0 & 0 & 0 \\ \ldots & \ldots & \ldots & \ldots & \ldots & \ldots & \ldots & \ldots & \ldots & \ldots & \ldots & \ldots \\ 0 & 0 & 0 & 0 & 0 & 0 & 0 & \ldots & -A & -B & 0 & I \end{bmatrix}$$

$$E = \begin{bmatrix} 0 & I & -I & 0 & 0 & 0 & \ldots & 0 & 0 & 0 \\ 0 & 0 & 0 & 0 & I & -I & \ldots & 0 & 0 & 0 \\ \ldots & \ldots & \ldots & \ldots & \ldots & \ldots & \ldots & \ldots & \ldots & \ldots \\ 0 & 0 & 0 & 0 & 0 & 0 & \ldots & 0 & I & -I \\ 0 & -I & -I & 0 & 0 & 0 & \ldots & 0 & 0 & 0 \\ 0 & 0 & 0 & 0 & -I & -I & \ldots & 0 & 0 & 0 \\ \ldots & \ldots & \ldots & \ldots & \ldots & \ldots & \ldots & \ldots & \ldots & \ldots \\ 0 & 0 & 0 & 0 & 0 & 0 & \ldots & 0 & -I & -I \end{bmatrix}, \text{ and}$$

where 1 is a vector of ones, 0 is a vector or matrix of zeros depending on the context, and I is the identity matrix.

However, the conventional LP approach is inaccurate and unreliable. For example, some definitions of hard constraints make the problem infeasible, i.e., the controller cannot determine a solution for maintaining the spacecraft within the error range. Thus, the spacecraft is without an effective control plan. Even if a solution can be determined, the execution of an open-loop control plan is not always accurate and causes the spacecraft to be at positions outside the prescribed error range. Also, the LP problem assumes that the variables are continuous, so quantization of the parameters for control is not considered.

SUMMARY OF THE INVENTION

Some applications require that objects, such as a spacecraft, are maintained within an error range from a base pose. Unfortunately, the spacecrafts are subjected to different forces, which cause the spacecraft to be displaced. For example, the spacecrafts are subjected to "perturbative" forces, such as those caused by the non-uniform gravity of the Earth, gravitational effects of other heavenly bodies, solar pressure, atmospheric drag, and propulsion systems. Therefore, the spacecraft must compensate for the perturbative forces. Typically, to keep the spacecrafts within the error range from the base pose, on-board thrusters provide impulsive forces of very short durations, which are modeled as instantaneous changes in velocity, i.e., $\Delta V$.

Maneuvers compensating for the displacement of the spacecrafts are known as "formation-keeping" or "formation-flying." For a single spacecraft, compensating maneuvers are called "station-keeping." Hereafter, the term "formation-keeping" is used to describe all possible maneuvers of the spacecraft, i.e., the term describes a process for maintaining a spacecraft within the error range of the base pose with respect to at least one direction of displacement.

Control module of the spacecrafts determines a direction, a time instant, and a magnitude of the compensative force to satisfy the formation-keeping requirements. Control modules that provide good performance optimize consumption of propellant, which has a direct impact on a mission life of the spacecraft, and reduce the number of impulses, which increases the effective observation time because the impulses may momentarily interrupt operations of the spacecraft.

An objective of the present invention is to provide a system and a method for maintaining an object within an error range from a base pose in response to a displacement of the object to a displaced pose with respect to at least one direction of the displacement. In one embodiment, the object is a spacecraft. In one variation of this embodiment, the spacecraft is a satellite.

Another objective of the invention is to maintain the spacecraft within the error range while minimizing the number of compensative force, e.g., impulses, issued to compensate for the displacement. To that end, a magnitude of a force to be issued in the direction opposite to the direction of displacement is determined.

Embodiments of invention are based on a realization that the compensative force is formed by two independent components, i.e., a base force that serves to prevent an increase of the displacement of the spacecraft, and an excess force that serves to maintain the spacecraft within the error range and to optimize a period of time between issuances of the force.

Embodiments of the invention determine the two components separately, such that the combination of the components enables maintaining the spacecraft within the error ranges, and increases a performance of the spacecraft. Furthermore, the independence of the components significantly reduces the computational complexity of the formation-keeping, and, in contrast to the prior art, allows determining dynamically both the time and a magnitude of the force compensating for the displacement.

Moreover, the embodiments are based on another realization that a magnitude of the base force can be determined directly from the velocity of the spacecraft at the displaced pose. One variation of this embodiment considers a quantized nature of a magnitude of the compensative force. In this variation, the magnitude of the base force is determined based on the velocity and the quantization resolution of the magnitude. A result of application of the force of the base magnitude to the spacecraft at the displaced position is that the velocity of the spacecraft becomes substantially zero with respect to the direction of the displacement, which prevents an increase of the extent of the displacement.

The magnitude of the excess force is determined to decrease the displacement of the spacecraft and maintain the spacecraft within the error range. Accordingly one embodiment determines the excess magnitude based only on the error range along the direction of the displacement. Moreover, another embodiment considers the quantization resolution of the magnitude of the force to determine a discrete control set of factors and selects the factor that along with the quantization resolution provides the magnitude of the excess force.

One embodiment discloses a method for formation-keeping of a spacecraft in response to a displacement of the spacecraft to a displaced pose with respect to at least one direction of the displacement, wherein the spacecraft is configured to issue a compensative force by generating a command to issue a compensative force. The compensative force is determined as a function of a sum of the base force configured for maintaining the spacecraft in the displaced pose with respect to the direction of the displacement and an excess force configured for optimizing the formation-keeping with respect to the direction of the displacement of the spacecraft at the displaced pose.

Another embodiment discloses a control module adapted for maintaining a pose of a spacecraft with respect to an error range defined along a direction of displacement, wherein the spacecraft is configured to issue a compensative force, comprising: means for determining a base force, such that issuing the base force by the spacecraft results in a substantially zero velocity of the spacecraft at a displaced pose with respect to the direction of the displacement; means for determining an excess force, such that issuing the excess force by the spacecraft having the substantially zero velocity at the displaced pose optimizes the pose of the spacecraft with respect to the error range; and means for generating a command to issue the force in a direction opposite to the direction of the displacement, wherein the compensative force is a sum of the base force and the excess force.

Yet another embodiment discloses a method for determining a compensative force to compensate for a displacement of an object, comprising the steps of determining, by a processor, the compensative force as a function of a sum of a base force configured for preventing an increase of the displacement and an excess force configured for reducing the displacement, wherein a magnitude of the excess force is selected from a discrete control set of magnitudes.

DETAILED DESCRIPTION OF THE PREFERRED EMBODIMENT

Figure 1:
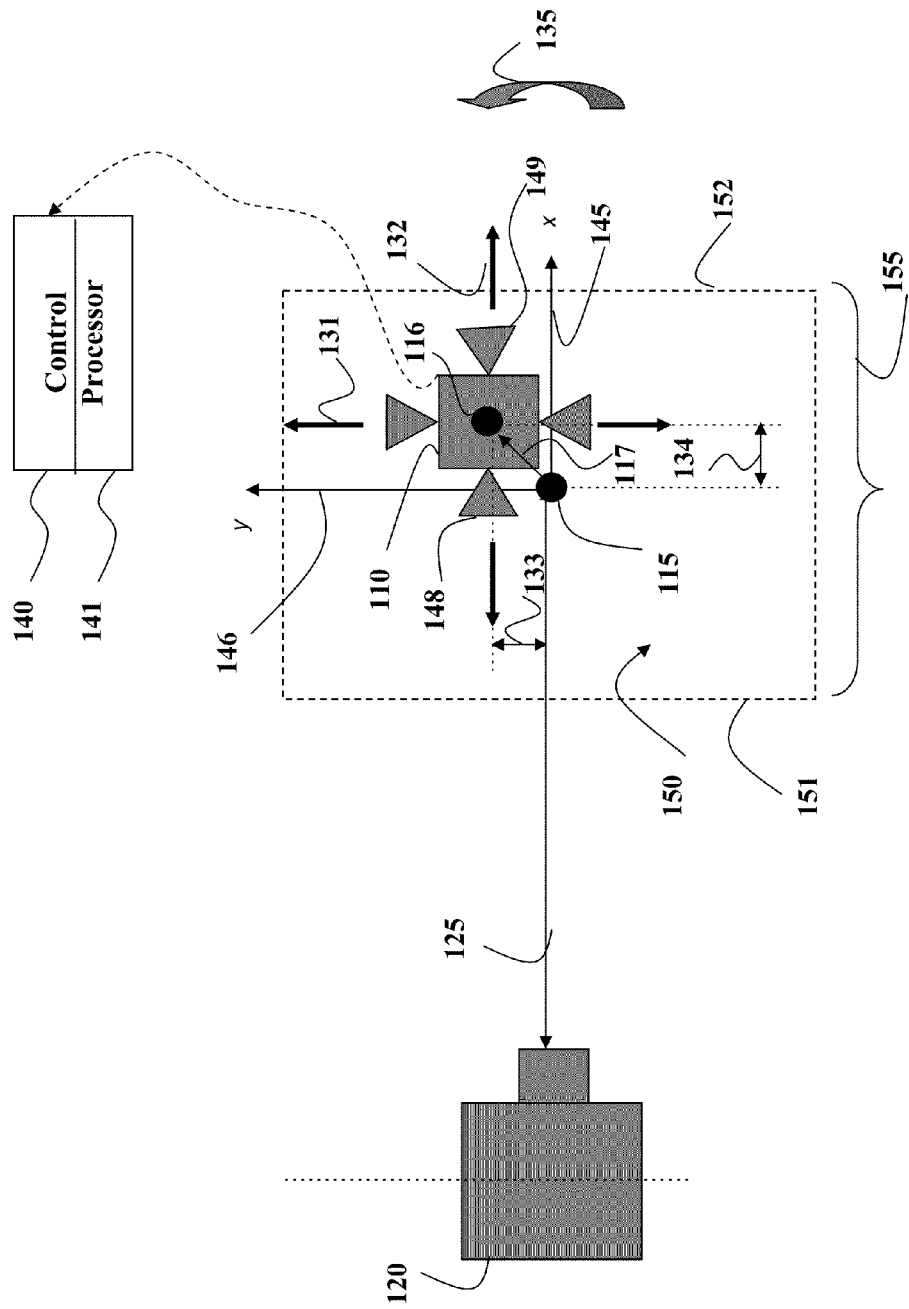
FIG. 1 is a block diagram of an example system and method for formation-keeping of a spacecraft.

FIG. 1 shows an example of a system and a method for formation-keeping of a spacecraft 110. The spacecraft is required to be maintained within an error range from a base pose 115 defined, for example, by a distance 125 from another spacecraft 120. In other embodiments, the base pose is defined with respect to a global coordinate system.

Different embodiments of the invention are described with respect to the spacecraft 110. However, the embodiments are applicable to any type of objects, both terrestrial and extraterrestrial.

The spacecraft is subjected to displacement forces 131-132, e.g., perturbative forces, causing a displacement of the spacecraft from the base pose 115 to a displaced pose 116. By convention, and as defined herein, forces are vectors having a magnitude and a direction.

Each pose is characterized by a (x, y, z) position and a ($\theta$, $\phi$, $\omega$) orientation of the spacecraft. Accordingly, the displacement can be translational, rotational, or a combination thereof. Usually, the direction of displacement 117 is a combination of translational and rotational displacement from the base pose toward the displaced pose. Similarly, a magnitude of displacement is a combination of planar and angular distances between the base pose and the displaced pose.

However, dynamics of the spacecraft are decoupled among degrees of freedom of the spacecraft. Embodiments of the invention are applicable to one or a combination of displacements of the spacecraft along axes of displacement, e.g., along an axis x 145 and an axis y 146, or around the axes of displacement, e.g., rotation 135 around the axis x. Accordingly, the displacement can be described separately or in combination by extends of displacements 133-134 along the axes of the displacements.

For clarity of this description, the embodiments are described for a translational displacement of the spacecraft along the x axis. Accordingly, for the purpose of this specification and appending claims, the extent of the displacement is a distance between the displaced pose and the base pose along or around at least one axis of the displacement, e.g., the extent 134, and the direction of the displacement is a direction from the base pose toward the displaced pose along or around at least one axis of the displacement.

The spacecraft includes a control module 140 configured to compensate for the displacement by generating commands to issue a compensative force in a direction opposite to the direction of the displacement. The control module includes a processor 141 as known in the art. The spacecraft includes at least two thrusters 148-149 arranged in opposing directions, and aligned with or about selected axes of the displacement.

The force for compensation of the displacement can be continuous or impulsive, wherein a magnitude is an integral of the force with respect to time. When the force is applied to the spacecraft, the momentum and the velocity of the spacecraft is changed. However, a small force applied for a long time can produce the same momentum change as a large force applied briefly. Accordingly, for the purpose of this specification and appended claims a force has a direction and a magnitude, wherein a value of the magnitude is equal to a change of the velocity of the spacecraft along the direction in result of application of that force.

In one embodiment, the force is the impulsive force of a magnitude limited by a quantization resolution of the force, i.e., the magnitude is a multiple of the quantization resolution. The set of values of the magnitudes of the force can be continuous or quantized. The satellite with the continuous control implementation can apply an impulse with any magnitude. The satellite with a quantized control implementation can only apply the force with a magnitude that is a multiple of the quantization resolution. For example, for a quantization resolution of 3 mm/s, the available magnitudes are 0 mm/s, 3 mm/s, 6 mm/s, 9 mm/s, and so on.

Typically, the displacement has to be maintained within the error range 155 having an extent range. The error ranges are defined for each lateral and angular displacement. The error ranges for different axes of displacement form an error box 150 having sides 151-152 surrounding the predetermined position such that the predetermined position is substantially in a center of the error box. Typically, a type of the error range corresponds to the displaced pose such that the displaced pose borders the error range. For example, when the spacecraft is displaced along x axis, the corresponding error range along the x axis is selected to maintain the spacecraft within that range. Typically, maximum displacement is a half of an extent of the error range.

One objective of the formation-keeping is to maintain the spacecraft within the error ranges while minimizing the number of impulses issued to compensate for the displacement. To that end, the magnitude of the impulsive force to be issued in the direction opposite to the direction of displacement is determined.

Embodiments of invention are based on a realization that the above objective includes two independent components of the compensative force. One component, hereafter "a base force," serves to prevent an increase of the displacement of the spacecraft, i.e., serves to maintain the spacecraft in the error range. Another component, hereafter "an excess force," serves to reduce the displacement of the spacecraft and to optimize a period of time between issuance of the compensative force and issuance of a next compensative force. The two separate components are determined separately, such that the combination of the components enables maintaining the spacecraft within the error ranges, and increases a performance of the spacecraft. Furthermore, the independence of the components significantly reduces the computational complexity of the formation-keeping, and, in contrast to the prior art, allows determining dynamically both the time and a magnitude of the compensative force.

Moreover, the embodiments are based on another realization that the magnitude of the base force can be determined directly from the velocity of the spacecraft at the displaced pose and a quantization resolution of the control module. A result application of the compensative force of the base magnitude to the spacecraft at the displaced position is that the velocity of the spacecraft becomes substantially zero, which prevents an increase of the extent of the displacement. For example, in one embodiment, the substantially zero velocity has a value less than the quantization resolution. In one variation of this embodiment, the substantially zero velocity has a direction opposite to the direction of the displacement.

The excess force is determined to decrease the extent of the displacement of the spacecraft having the substantially zero velocity and thus the value of the excess magnitude is independent from the velocity of the spacecraft. In one embodiment, the magnitude of the excess force is a random number constrained by the quantization resolution of the control module. However, other embodiments use the independence of the excess magnitude from the velocity to optimize the value of the excess magnitude based on the quantization resolution of the control and the error range. Furthermore, because of the quantized nature of the control, the magnitude of the excess force can be selected from a discrete control set of finite cardinality.

For example, one embodiment considers the magnitude of the displacement, e.g. perturbative, force bounded by a value $d_{max}$. The discrete control set is determined by setting a range for the elements of the set. The least element is zero, and the greatest element equals the minimum quantized magnitude that allows the spacecraft to reach the opposite side of the error range while starting from zero velocity and being opposed by a constant perturbative force of magnitude $d_{max}$.

In some embodiments, an optimum magnitude of the excess force is determined using integer programming (IP). Because the discrete control set typically has a small number of elements, e.g., less than fifteen for a coarse quantization, and a small error range, one embodiment solves the IP problem using a total enumeration technique.

Figure 2:
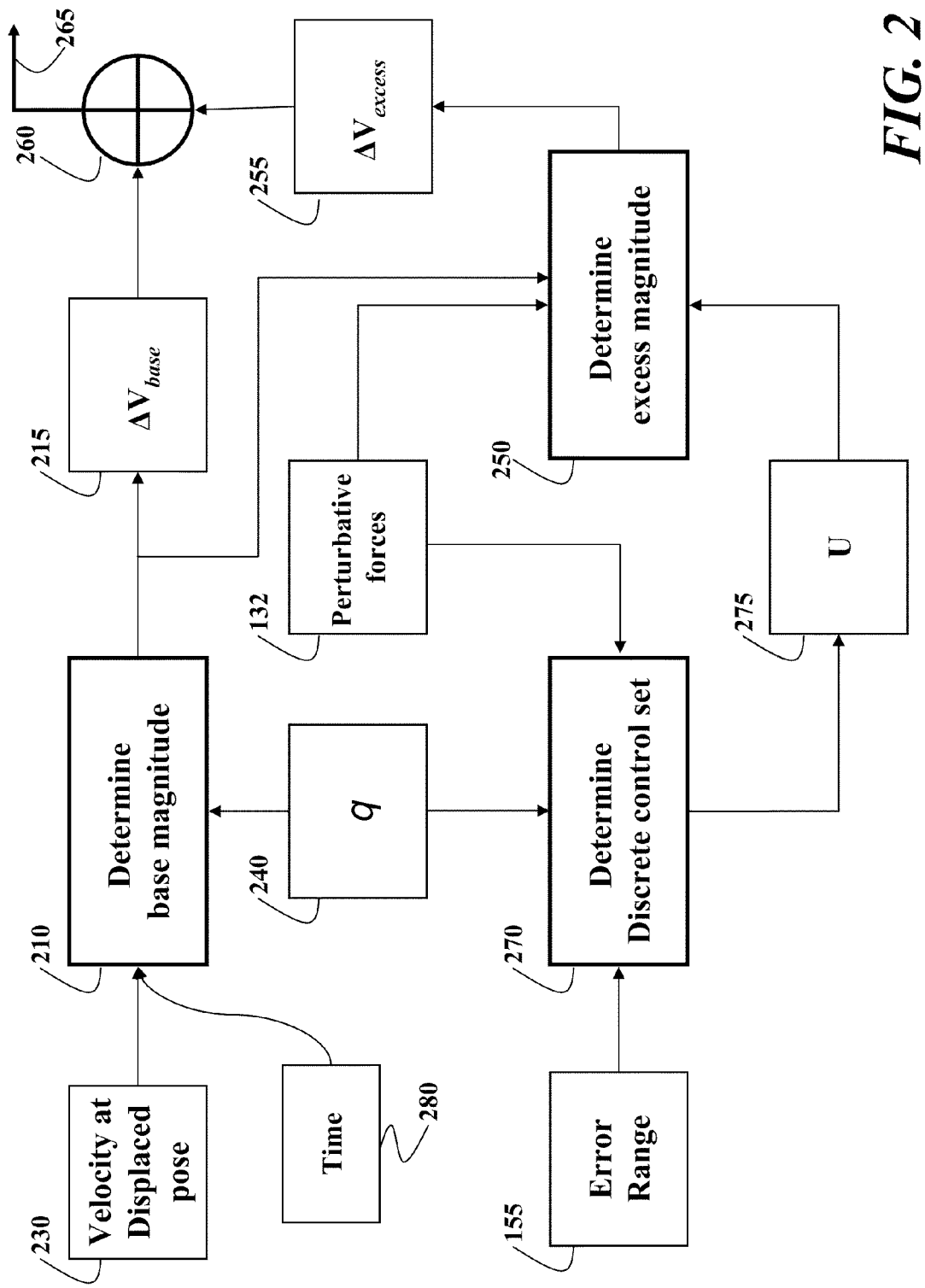
FIG. 2 is a flow diagram of a method for formation-keeping of the spacecraft according embodiments of the invention.

FIG. 2 shows a block diagram of a method for formation-keeping of the spacecraft according embodiments of the invention. First, the method determines 210 the base magnitude 215 of the compensative force, such that an application of the compensative force of the base magnitude to the spacecraft at the displacement results in a substantially zero velocity of the spacecraft preventing an increase of the extent of the displacement. Usually, the base magnitude determined at a time 280 of the compensative force, wherein the time is determined based on the extent of the displacement, as described below.

In one embodiment, the compensative force is impulsive and the magnitude of the base force $\Delta V_{base}$ is quantized and determined directly from a velocity 230 of the spacecraft at the displaced pose and a quantization resolution q 240 of the control module according to $$\Delta V_{base} = \left\lceil \frac{|v|}{q} \right\rceil q.$$

The issuance of the base force guarantees that the displacement is maintained within the error range. The method also determines 250 an excess magnitude $\Delta V_{excess}$ 255, such that an application of the compensative force of the excess magnitude to the spacecraft having the substantially zero velocity at the displaced pose also decreases the displacement. Accordingly, the control module generates a command to issue the compensative force at the specified time 280, wherein a magnitude 265 of the compensative force is equal to a sum 260 of the base magnitude 215 and the excess magnitude 255.

In some embodiments, the magnitude of the excess force is obtained from the discrete control set U 275, where $U \subset N_0$. In one embodiment, the magnitude is determined by multiplying the quantization resolution by a selected element from the discrete control set. Because of the quantized nature of the control module, the discrete control set $U \subset N_0$ has a finite number of elements $N_U$, i.e. $U=\{0, 1, \ldots, N_U-1\}$. In several embodiments, a smallest element of the discrete control set is either zero or one.

A greatest element of the discrete control set U is determined 270 as a minimum magnitude of the excess force that causes the spacecraft to reach an opposite side of an error range 155 while starting from the displaced pose with substantially zero velocity and being opposed by the displacement force of the magnitude $d_{max}$. For example, if the constant magnitude $d_{max}$ is equal than 2 mm/s², the quantization resolution is 3 mm/s, and the error range is 400 mm. The minimum continuous-magnitude is given by $$\Delta v = 2\sqrt{d_{max} \frac{range}{2}}$$

For this example, the minimum control is 40 mm/s. The greatest element of U is given by $$\max U = \left\lceil \frac{\Delta v}{q} \right\rceil$$

where q is the quantization resolution. The greatest element is 14, so the discrete control set U can now be defined to consists of 15 elements, $U=\{0, 1, \ldots, 14\}$.

In one embodiment, the magnitude excess force is obtained by randomly selecting an element from the discrete control set. In an alternative embodiment, an integer programming (IP) is used to determine an optimal value u* for the excess magnitude according to $$\max_u \varphi(u, \Delta V_{base}, t), u \in U,$$

wherein a function φ maximizes a period of time Δt between the issuances of the compensative force. The time t as an argument of a function φ considers the fact that the perturbative force can be time-varying. For a particular element u∈U, the function φ is the period of time between the application of the force of magnitude $\Delta V_{base}$+q*u at time t and the next time t+Δt. Since the dynamics of the system and the perturbative force are known, it is possible to predict the future behavior of the system and the period of time after the force of a particular magnitude is issued.

One embodiment takes into account the value of the base magnitude as described above. Another embodiment directly assumes that at the time of issuing the impulsive force the velocity of the spacecraft is substantially zero and does not use the value of the base magnitude of the impulsive force.

In a particular, the value u of the magnitude of the excess force is determined either analytically or numerically depending on the nature of the perturbative forces. Therefore, during the search for the optimal u*, the value of the perturbative forces are taken in to account.

Typically, the control set U has a small number of elements, e.g., less than fifteen, due to coarse quantization and the small error range. Thus, in one embodiment, the IP problem can be solved using the total enumeration technique. For example, every element of the control set U is evaluated to obtain its associated period of the time. The element that provides the maximum period of the time is the optimal element u*.

For larger control sets with sizes in the hundreds or the thousands, methods such as genetic algorithms (GA) can be more efficient in estimating the optimal solution. However, in contrast with the conventional methods, a solution can always be found that satisfies the hard constraints due to the application of the base force.

Figure 3:
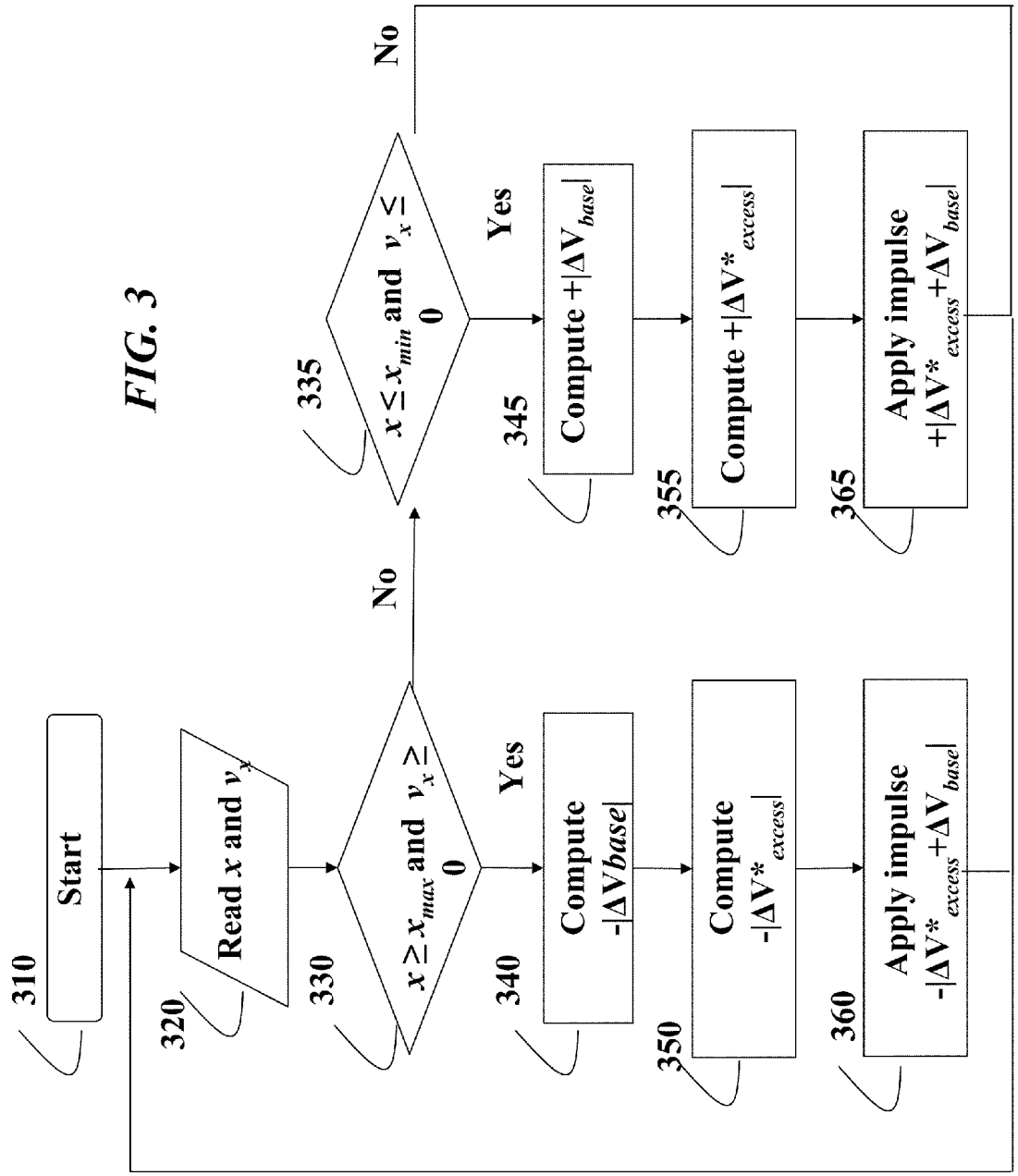
FIG. 3 is a flow diagram of a method for the formation-keeping along an x axis of the displacement according one embodiment of the invention.

FIG. 3 shows a flow diagram of a method for the formation-keeping of a spacecraft along the x axis of the displacement according one embodiment of the invention. Similar methods are used for the formation-keeping along or around other axes of the displacement. Upon starting 310, the control module reads 320 current position x and velocity $v_x$ of the spacecraft.

If the control module determines 330 that the spacecraft is at the upper boundary of the error range and moves away from the base pose, then the control module determines 340 the magnitude $\Delta V_{base}$ of the base force that prevents the spacecraft from displacing from the base pose beyond the specified error range. Then, the control module determines 350 a magnitude $\Delta V_{excess}$ of the excess force that in combination with the base force optimizes the performance of the formation-keeping along the direction of the displacement. Next, the control module generates commands 360 to the thrusters pointing in the negative x direction to issue the compensative force as a function of a sum of the base and the excess magnitudes, i.e., the magnitude of the compensative force equals $\Delta V_{base}+\Delta V_{excess}$, and the direction of the compensative force is a direction opposite to the direction of the displacement.

If the control module determines 330 that the spacecraft is at a lower boundary and moving away from the error range, then the control module determines 345 the base force, determines 355 the excess force and commands 365 to the thrusters pointing in the positive x direction to issue an impulse of the magnitude equal to the sum of the base and the excess magnitudes.

Finally, if the spacecraft is inside the error range, no control command is generated. The method is repeated repeatedly, i.e., the control module obtains the current position x and the current velocity $v_x$, evaluates the control rules, and determines the command to be generated, if any.

However, the direct application of the above method can cause the spacecraft to be displaced beyond the error range of the predetermined position for a brief time related to the duration of a time step. Accordingly, one embodiment predicts whether the spacecraft will be displaced beyond the error range in the next one or few time steps. In this embodiment, the control module evaluates the control rules and the command to issue the respective impulsive forces in advance.

Figure 4:
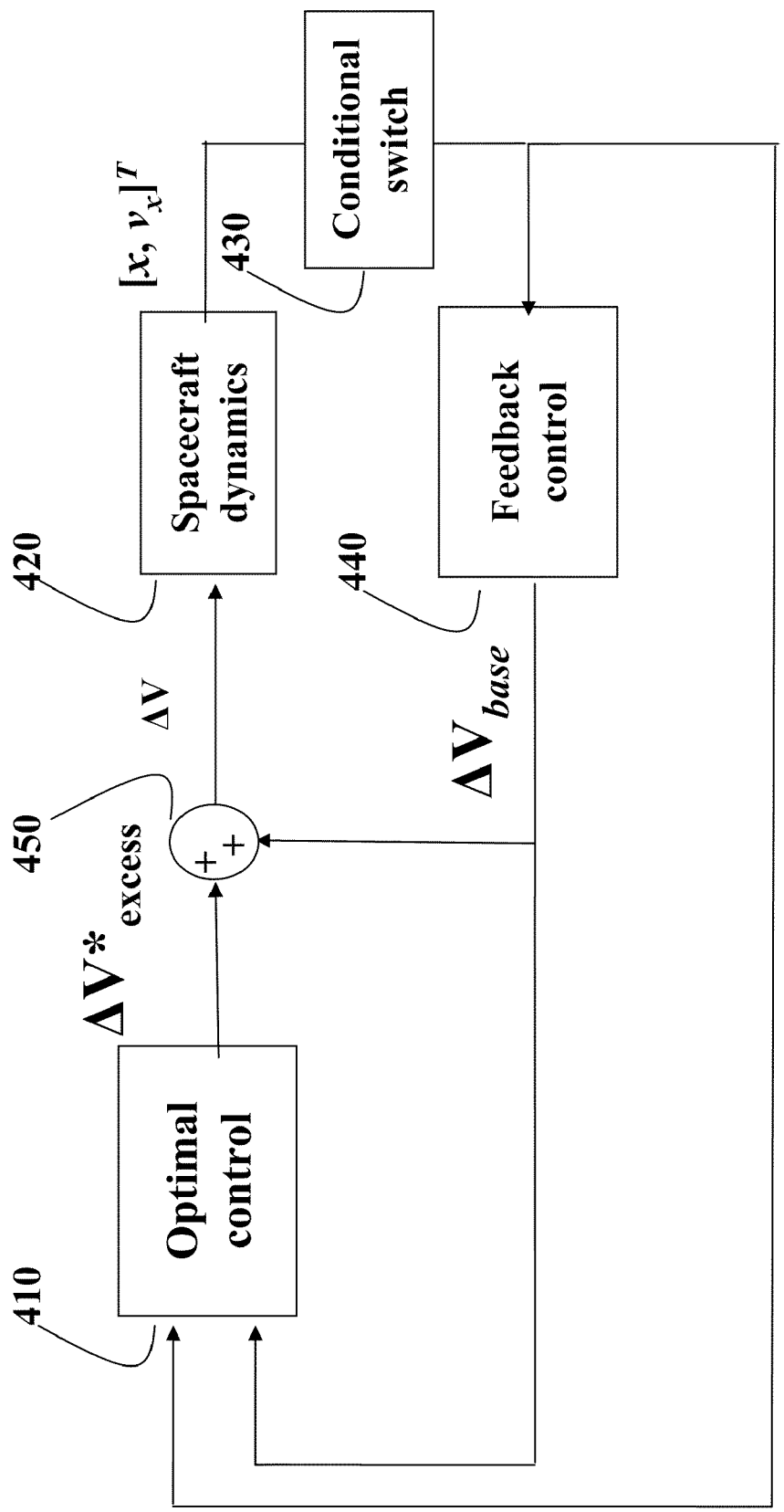
FIG. 4 is a schematic of a discrete-time controller according embodiments of the invention.

In some embodiments, the control modules is implemented as a discrete-time controller as shown in FIG. 4 that periodically senses the state of the system, i.e., the position and the velocity of the spacecraft, evaluates the control rules, and generates the command, if necessary. The state is evaluated in a conditional switch 430 to determine whether a compensative force is to be applied or not. If the compensative force is to be applied, the state information is transmitted to a feedback control 440 for the computation of the base force. The state information is also transmitted to the optimal control 410 along with the base control for the computation of the excess force. The base control and the optimal excess control are added 450 to determine the command that will be issued to the thrusters.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for formation-keeping of a spacecraft in response to a displacement of the spacecraft to a displaced pose with respect to at least one direction of the displacement, wherein the spacecraft is configured to issue a compensative force, comprising the steps of:
   determining the compensative force as a function of a sum of a base force configured for maintaining the spacecraft in the displaced pose with respect to the direction of the displacement and an excess force configured for optimizing the formation-keeping with respect to the direction of the displacement of the spacecraft at the displaced pose, wherein the compensative, the base and the excess forces have a quantization resolution, the displaced pose borders an error range along the direction of the displacement;
   determining a magnitude of the base force according to $$\Delta V_{base} = \left\lceil \frac{|v_x|}{q} \right\rceil q,$$

wherein $\Delta V_{base}$ is the magnitude of the base force along the direction of the displacement x, $v_x$ is a veloci of the spacecraft along the direction of the displacement, and q is the quantization resolution;
    determining a magnitude of the excess force from a discrete control set of magnitudes, wherein a largest element maxU of the discrete control set is determined according to $$\mathrm{max}U = \left\lceil \frac{\Delta v}{q} \right\rceil,$$

wherein $\Delta v$ is $$\Delta v = 2\sqrt{d_{max}\frac{\text{range}}{2}},$$

wherein range is an extent of the error range, and $d_{max}$ is an upper bound of a displacement force; and
    generating a command to issue the compensative force, wherein the steps of the method are performed by a processor.

2. The method of claim 1, further comprising:
determining a magnitude of the base force based on a velocity of the spacecraft at the displaced pose.

3. The method of claim 2, wherein the base force is an impulsive force having a quantization resolution such that the magnitude of the base force is multiple of a quantization resolution, further comprising:
    determining the magnitude of the base force based on the quantization resolution.

4. The method of claim 3, wherein the determining of the magnitude is according to $$\Delta V_{base} = \left\lceil \frac{|v_x|}{q} \right\rceil q,$$

wherein $\Delta V_{base}$ is the magnitude of the base force along the direction of the displacement x, $v_x$ is the velocity of the spacecraft along the direction of the displacement, and q is the quantization resolution.

5. The method of claim 1, wherein the displaced pose borders an error range, further comprising:
determining the excess force based on the error range.

6. The method of claim 1, wherein the excess force is an impulsive force having a quantization resolution such that the magnitude of the excess force is in ultiple of a quantization resolution, further comprising:
    acquiring an error range along the direction of displacement; and
    determining the excess magnitude based on the error range and the quantization resolution such the excess force optimizes a period of time between the compensative force and a next compensative force.

7. The method of claim 6, further comprising:
determining a discrete control set of magnitudes; and
selecting the magnitude of the excess force from the discrete control set.

8. The method of claim 7, further comprising:
determining the magnitude of the excess force from the discrete control set using a total enumeration technique.

9. The method of claim 7, further comprising:
determining the magnitude of the excess force from the discrete control set using an integer programming (IP).

10. The method of claim 9, wherein a number of elements in the discrete control set $U \subset N_0$, $U = \{0, 1, \ldots, N_u-1\}$ has finite cardinality $N_u$, and the IP determines an optimal u* by maximizing a function φ

$$\max_u \varphi(u, \Delta V_{base}, t), u \in U,$$

wherein u is the excess force, $\Delta V_{base}$ is a magnitude of the base force, t is the time when the compensative force is applied.

11. The method of claim 7, wherein the spacecraft is subjected to a displacement force with a magnitude bounded by a value $d_{max}$, wherein the determining a discrete control set further comprises:
    determining a largest element of the discrete control set as a minimum magnitude of the excess force that causes the spacecraft to reach an opposite side of an error range, while starting from the displaced pose with substantially zero velocity and being opposed by the displacement force of the magnitude $d_{max}$; and
    selecting a smallest element of the discrete control set as either zero or one.

12. The method of claim 11, further comprising.
determining a miriiinurii'bontinuous-magnitude $\Delta v$ according to $$\Delta v = 2\sqrt{d_{max}\frac{\text{range}}{2}},$$

wherein range is an extent of the error range; and
    determining the largest element maxU according to $$\mathrm{max}U = \left\lceil \frac{\Delta v}{q} \right\rceil,$$

wherein q is the quantization resolution.

13. The method of claim 1, further comprising:
determining a time to issue the compensative force based on an extent of the displacement and an error range.

14. A control module adapted for maintaining a pose of a spacecraft with respect to an error range defined along a direction of displacement, wherein the spacecraft is configured to issue a compensative force, comprising:
    means for determining a base force, such that issuing the base force by the spacecraft results in a substantially zero velocity of the spacecraft at a displaced pose with respect to the direction of the displacement;
    means for determining,an excess force, such that issuing the excess force by the spacecraft having the substantially zero velocity at the displaced pose optimizes the pose of the spacecraft with respect to the error range;
    means for generating a command to issue the force in a direction opposite to the direction of the displacement, wherein the compensative force is a sum of the base force and the excess force; and
    means for detennining'a time to issue the compensative force based on an extent of the displacement and an error range, wherein the means for determining excess force includes a processor configured to determine a magnitude of the excess force according to $$\max U = \left\lceil \frac{\Delta v}{q} \right\rceil,$$

wherein $\Delta v$ is $$\Delta v = 2\sqrt{d_{max}\frac{\text{range}}{2}},$$

wherein range is an extent of the error range, and $d_{max}$ is an upper bound of a displacement force.

15. The control module of claim 14, wherein the means for determining the basic force includes a processor configured to determine a magnitude of the base force according to $$\Delta V_{base} = \left\lceil \frac{|v_x|}{q} \right\rceil q,$$

wherein $\Delta V_{base}$ is the magnitude of the base force along the direction of the displacement x, $v_x$ is a velocity of the spacecraft along the direction of the displacement, and q is the quantization resolution.

16. A method for determining a compensative force to compensate for a displacement of an object, comprising the steps of:

determining, by a processor, the compensative force as a function of a sum of a base force configured for preventing an increase of the displacement and an excess force configured for reducing the displacement,
determining a magnitude of the excess force according to $$\Delta v = 2\sqrt{d_{max}\frac{\text{range}}{2}},$$

wherein $\Delta v$ is $$\max U = \left\lceil \frac{\Delta v}{q} \right\rceil,$$

range is an extent of an error range, q is a quantization resolution and $d_{max}$ is an upper bound of a displacement force.

17. The method of claim 16, further comprising:
determining a largest element of based on the displacement and a displacement force; and
selecting a smallest element of the discrete control set as either zero or one.

18. The method of claim 16, further comprising:
defining the displacement as a half of an extent of the error range.

* * * * *